(12) United States Patent
Corma Canós et al.

(10) Patent No.: US 6,896,869 B2
(45) Date of Patent: May 24, 2005

(54) MICROPOROUS CRYSTALLINE MATERIAL (ITQ-17), METHOD FOR THE PREPARATION THEREOF AND ITS USE IN PROCESSES FOR SEPARATING AND TRANSFORMING ORGANIC COMPOUNDS

(75) Inventors: Avelino Corma Canós, Valencia (ES); María Teresa Navarro Villalba, Valencia (ES); Fernando Rey García, Valencia (ES); Susana Valencia Valencia, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 40 days.

(21) Appl. No.: 10/412,641

(22) Filed: Apr. 11, 2003

(65) Prior Publication Data

US 2003/0229257 A1 Dec. 11, 2003

Related U.S. Application Data

(63) Continuation of application No. PCT/ES01/00385, filed on Oct. 11, 2001.

(30) Foreign Application Priority Data

Oct. 11, 2000 (ES) .......................................... 200002536

(51) Int. Cl.[7] .............................................. C01B 39/48
(52) U.S. Cl. ...................... 423/718; 423/706; 423/708; 423/709; 208/46
(58) Field of Search .............................. 423/706, 708, 423/718, DIG. 27; 208/46

(56) References Cited

U.S. PATENT DOCUMENTS 2,882,243 A * 4/1959 Milton ........................ 423/718

6,419,819 B1 * 7/2002 Dhingra et al. ............. 208/113
2003/0185751 A1 * 10/2003 Chester et al. .............. 423/705

OTHER PUBLICATIONS

Corma,A.; Pure polimorph C of zeolite beta synthesized by using framework isomorphous substitution as a structure–directing mechanism; Angew. Chem., Int. Ed. 2001, vol. 40, No. 12, pp. 2277–2280, Jun. 18, 2001, ISSN 1433–7851.
Corma, A.; Synthesis of pure polimorph C of beta zeolite in a fluoride—free system; Chem. Commun. (Cambridge, U.K.) 2001, vol. 16; pp. 1486–1487; Aug. 10, 2001, ISSN 1359–7345.

* cited by examiner

Primary Examiner—David Sample
(74) Attorney, Agent, or Firm—Klauber & Jackson

(57) ABSTRACT

A microporous crystalline material of a zeolitic nature, that corresponds to the empirical formula $$x(M_{1/n}XO_2):yYO_2:zGeO_2:(1-z)TO_2$$

wherein
x has a value between 0 and 0.2;
y has a value between 0 and 0.1;
z has a value between 0 and 0.67;
being at least one of the z, x and y above zero;
M is selected between H+ and inorganic cations with a +n charge;
X is at least one chemical element with a +3 oxidation status;
Y is at least one chemical element with a +4 oxidation status; and
T is at least one chemical element with a +4 oxidation status;
and is also characterised by its X-ray diffraction pattern and its microporous properties, and can be employed as a catalyst or oxidating agent in the separation and transformation of organic compounds.

27 Claims, 6 Drawing Sheets

2θ (degrees)

MICROPOROUS CRYSTALLINE MATERIAL (ITQ-17), METHOD FOR THE PREPARATION THEREOF AND ITS USE IN PROCESSES FOR SEPARATING AND TRANSFORMING ORGANIC COMPOUNDS

This application is a continuation of international application number PCT ES01/00385, filed Oct. 11, 2001

TECHNICAL FIELD OF THE INVENTION

This invention refers to microporous crystalline materials, particularly materials of a zeolitic nature, and specially materials of a zeolitic nature useful in the separation and transformation of organic compounds.

STATE OF THE ART BEFORE THE INVENTION

Zeolites are microporous crystalline materials formed by a crystalline network of tetrahedrons $TO_4$ that share all their vertices leading to a three dimensional structure that contains channels and/or cavities of molecular dimensions. They are of a variable composition, and T generally represents atoms with a formal +3 or +4 oxidation status, such as, for example Si, Ge, Ti, Al, B, Ga, . . . If any of the T atoms has an oxidation status of less than +4, the crystalline network formed shows negative charges that are compensated by means of the presence of organic or inorganic cations in the channels and cavities. Organic molecules and $H_2O$ can also be lodged in said channels and cavities, for which, in a general manner, the chemical composition of the zeolites can be represented by means of the following empirical formula:

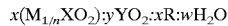

wherein M is one or various organic or inorganic cations with +n charge; X is one or various tri-valent elements; Y is one or various tetra-valent elements, generally Si; and R is one or various organic substances. Although by means of post-synthesis treatments the nature of M, X, Y and R and the values of x, y, z and w can be varied, the chemical composition of a zeolite (as synthesised or after its calcinations) possesses a characteristic range for each zeolite and its method of being obtained.

On the other hand, the crystalline structure of each zeolite, with a specific system of channels and cavities, leads to a characteristic X-ray diffraction pattern. Therefore, the zeolites are differentiated among themselves through their range of chemical composition plus their X-ray diffraction pattern. The two characteristics (crystalline structure and chemical composition) also determine the physical and chemical properties of each zeolite and its possible application in different industrial processes.

DESCRIPTION OF THE INVENTION

This invention refers to a microporous crystalline material of a zeolitic nature, denominated ITQ-17, to its method of preparation and its uses in processes for the separation and transformation of organic compounds.

This material (identified also as the "ITQ-17 zeolite" in this description) is characterised by its X-ray diffraction pattern and by its chemical composition. In its anhydrous and calcinated form, the chemical composition of ITQ-17 can be represented by means of the empirical formula

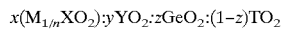

wherein x has a value lower than 0.2, preferably lower than 0.067 and even more preferably lower than 0.05, and may be equal to zero;

y has a value of less than 0.1, preferably less than 0.05 and even more preferably less than 0.02, and may be equal to zero;

z has a value between 0 and 0.67, and preferably between 0.01 and 0.67, and even more preferably between 0.025 and 0.5, M is H+ or one or various inorganic cations with a +n charge;

X is one or various chemical elements with a +3 oxidation status such as, for example, Al, Ga, B, Cr, Y is one or various chemical elements with a +4 oxidation status such as, for example, Ti, Sn, V;

and T is at least one chemical element with a +4 oxidation status such as, for example, Si, Ti, Sn, V;

at least one of x, y, z being above zero.

The existence of defects in the crystalline network is possible, however, in terms of the method of synthesis and of its calcination or later treatments, which are shown by the presence of Si—OH groups (silanols). These defects have not been included in the above empirical formulae.

The material of the invention is also characterised by its X-ray diffraction pattern that is shown in table 1 wherein the values of angle 2 and relative intensities ($I/I_0$) of the reflections of the X-ray diffraction pattern are shown.

TABLE 1

| 2 (±0.5 degrees) | Relative Intensity ($I/I_0$) |
|---|---|
| 6.91 | s–vs |
| 9.60 | s–vs |
| 19.29 | w |
| 21.34 | w |
| 21.88 | s–vs |
| 27.00 | vw |
| 27.80 | vw |
| 29.09 | vw |
| 30.40 | vw |
| 32.56 | vw |
| 35.04 | vw |
| 35.63 | vw |
| 39.01 | vw |

Typically, although not indispensably, in addition to the values that appear in table 1, the ITQ-17 material also shows the values of angle 2 and the relative intensities ($I/I_0$) of the reflections of the X-ray diffraction pattern.

TABLE IA

| 2 (±0.5 degrees) | Relative Intensity ($I/I_0$) |
|---|---|
| 15.09 | vw |
| 16.51 | vw |
| 20.48 | vw |
| 22.94 | vw |
| 24.80 | vw |
| 28.53 | vw |
| 31.14 | vw |
| 39.01 | vw |

In turn, the X-ray diffraction pattern of the calcinated and anhydrous ITQ-17 material is shown in table II:

TABLE II

| 2 (±0.5 degrees) | Relative Intensity ($I/I_0$) |
|---|---|
| 6.94 | s–vs |
| 9.60 | s–vs |

TABLE II-continued

| 2 (±0.5 degrees) | Relative Intensity (I/I₀) |
|---|---|
| 13.38 | vw |
| 15.01 | vw |
| 22.09 | w |
| 24.96 | vw |
| 26.90 | vw |

Also typically, although not indispensably, in addition to the values that appear in table I, the ITQ-17 material also shows the values of angle 2 and the relative intensities (I/I₀) of the reflections of the X-ray diffractogram which are shown in table IIA:

TABLE IIA

| 2 (±0.5 degrees) | Relative Intensity (I/I₀) |
|---|---|
| 13.94 | vw |
| 19.35 | vw |
| 21.03 | vw |
| 21.29 | vw |
| 28.11 | vw |
| 29.21 | vw |
| 30.34 | vw |
| 32.93 | vw |

The positions, widths and relative intensities of the diffraction peaks, in addition to those shown precisely in the above tables, can be modified according to the chemical composition of the material (type of structuring agent, Si/Ge ratio, presence of other tri-valent and/or tetra-valent heteroatoms (one or various) in the network, as well as silicon and/or germanium such as, for example: aluminium, boron, titanium, vanadium, etc.), together with the degree of hydration and the size of the crystal.

Thus table III shows the typical X-ray diffraction pattern of the ITQ-17 zeolite material of this invention as synthesised, where it can be seen that the variation in the measurements of the angle 2 due to an instrument error is estimated at ±0.5 degrees.

Table III is particularly representative of ITQ-17 zeolite materials with an Si/Ge=5 ration prepared with DABCO-benzyl as the structuring agent.

TABLE III

| 2 (±0.5 degrees) | Relative Intensity (I/I₀) |
|---|---|
| 6.91 | s–vs |
| 9.60 | s–vs |
| 13.44 | vw |
| 15.09 | vw |
| 16.51 | vw |
| 16.84 | vw |
| 19.29 | w |
| 20.48 | vw |
| 20.79 | vw |
| 21.34 | w |
| 21.88 | s–vs |
| 22.94 | vw |
| 23.79 | vw |
| 24.80 | vw |
| 25.79 | vw |
| 27.00 | vw |
| 27.80 | vw |
| 28.53 | vw |
| 29.09 | vw |
| 30.40 | vw |

TABLE III-continued

| 2 (±0.5 degrees) | Relative Intensity (I/I₀) |
|---|---|
| 31.14 | vw |
| 32.56 | vw |
| 33.53 | vw |
| 35.04 | vw |
| 35.63 | vw |
| 37.60 | vw |
| 39.01 | vw |

On the other hand, the values of angle 2 and the relative intensities (I/I₀) of the reflections of the powder in the X-ray diffractogram in the above sample of ITQ-17 in table III is shown, after being calcinated at 580° C. to remove the organic compounds occluded in the interior of the zeolite.

TABLE IV

| 2 (±0.5 degrees) | Relative Intensity (I/I₀) |
|---|---|
| 6.94 | s–vs |
| 9.60 | s–vs |
| 13.38 | vw |
| 13.94 | vw |
| 15.01 | vw |
| 15.48 | vw |
| 16.87 | vw |
| 19.35 | vw |
| 21.03 | vw |
| 21.29 | vw |
| 22.09 | w |
| 23.10 | vw |
| 23.99 | vw |
| 24.96 | vw |
| 25.91 | vw |
| 26.90 | vw |
| 28.11 | vw |
| 29.21 | vw |
| 30.34 | vw |
| 31.21 | vw |
| 32.93 | vw |
| 34.41 | vw |
| 35.30 | vw |
| 35.98 | vw |
| 39.39 | vw |

The X-ray diffraction patterns of the ITQ-17 zeolite, as synthesised, were obtained in a Philips PW 1830 diffractometer with a PW 1710 controller using CU Kα radiation, obtaining a diffraction pattern by means of the powder method and using a fixed divergence slit.

With regard to the % values of angle 2 and the relative intensities (I/I₀), I₀ is the most intense peak intensity to which a value of 100 is assigned. The variation in the measurements of angle 2 due to the instrument error is estimated at ±0.5 degrees.

On the other hand, the relative intensities have been expressed in the following terms in the above tables:
vw=very weak intensity (between 0 and 20%);
w=weak intensity (between 20 and 40%);
m=medium intensity (between 40 and 60%);
s=strong intensity (between 60 and 80%);
vs=very strong intensity (between 80 and 100%).

In a first embodiment of the ITQ-17 zeolite, T is Si, so that the empirical formula is shown as $$x(M_{1/n}XO_2){:}yYO_2{:}zGeO_2{:}(1-z)SiO_2$$

wherein x has a value of less than 0.2; y has a value of less than 0.1; z has a value of between 0 and 0.67; M is H+ or one or various inorganic cations with a +n charge; X is one or various chemical elements with a +3 oxidation status such, as for example, Al, Ga, B, Cr or Fe and Y is one or various chemical elements with a +4 oxidation status such as, for example, Ti, Sn or V.

In a second embodiment of the ITQ-17 zeolite, T is Si and y is zero, so that the empirical formula is shown as $$x(M_{1/n}XO_2):zGeO_2:(1-z)SiO_2$$

wherein x has a value of less than 0.2, and preferably less than 0.067, and more preferably less than 0.05, and may be equal to zero; z has a value of between 0 and 0.67, preferably between 0.01 and 0.67, and more preferably between 0.025 and 0.5; M is H+ or one or various inorganic cations with a +n charge; X is one or various chemical elements with a +3 oxidation status such, as for example, Al, Ga, B, Cr or Fe.

In a third embodiment of the ITQ-17 zeolite, x is zero and T is Si, so that the empirical formula is shown as $$yYO_2:zGeO_2:(1-z)SiO_2$$

wherein y has a value of less than 0.1, preferably less than 0.05, and more preferably less than 0.02, and may be equal to zero; z has a value of between 0 and 0.67, preferably between 0.01 and 0.67 and more preferably between 0.025 and 0.5; and y is one or various chemical elements with a +4 oxidation status such, as for example, Ti, Sn or V.

In a fourth embodiment of the ITQ-17 zeolite, M is H, T is Si and y is zero, so that the empirical formula is shown as $$x(HXO_2):zGeO_2:(1-z)SiO_2$$

wherein X is a trivalent element (Al, Ga, B, Cr or Fe), x has a value of less than 0.2, preferably less than 0.067, and more preferably less than 0.05, and may be equal to zero; z has a value of between 0 and 0.67, preferably between 0.01 and 0.67 and more preferably between 0.025 and 0.5.

In a fifth embodiment of the ITQ-17 zeolite, x and y are zero and T is Si and, so that the empirical formula is shown as $$zGeO_2:(1-z)SiO_2$$

wherein z has a value of between 0 and 0.67, preferably between 0.01 and 0.67 and more preferably between 0.025 and 0.5.

In a sixth embodiment of the ITQ-17 zeolite, z and y are zero, so that the empirical formula is shown as $$x(M_{1/n}XO_2):TO_2$$

wherein x has a value of less than 0.2; M is H+ or one or various inorganic cations with a +n charge; X is one or various chemical elements with a +3 oxidation status such, as for example, Al, Ga, B, Cr or Fe and T is one or various chemical elements with a +4 oxidation state such as Si, Ti, Sn or V, and can be preferably only or, at least, mainly Si.

The ITQ-17 zeolites can be obtained by means of a preparation method based on heating to temperatures of between 80° C. and 200° C., and preferably between 100° C. and 200° C., and more preferably between 130° C. and 175° C., a reaction mixture containing one or more of the following structure directing agents: Q-Benzyl and DABCO-benzyl cations, that have the following structures:

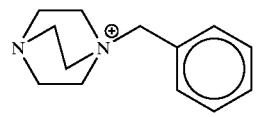

DABCO-benzyl

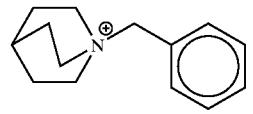

Q-Benzyl

The synthesis mixture also contains a silicon source from among which amorphous silica, colloidal silica, silica gel, silica halides and/or tetraalkylorthosilicate are optionally preferred, but preferably one can add a germanium source such as, for example, germanium oxide, germanium halides and/or germanium alcoxides. As an option, the synthesis mixture can contain a trivalent element such as, for example, Al, B, Ga, Cr, Fe and/or, also as an option, may contain a source of titanium and/or vanadium such as, for example, a titanium halide, alcoxide, and an alcoxide or sulphate of vanadium, and Sn. Lastly, a source of fluoride anions as a mineralising agent.

The synthesis composition necessary for synthesising ITQ-17 depends on the structural agent used.

In a general synthesis process, the silica and, optionally, germanium source are dissolved in one or more structure directing agents that are claimed in this invention: DABCO-benzyl, Q-benzyl. Then, if required, the trivalent and/or tetra-valent source elements (other than silicon and germanium) will be added. Lastly, the fluoride anions. The final pH of the mixture is between 6 and 9.

The composition of the synthesis mixture responds to the general empirical formula $$rRKM:aM_{1/n}OH:xX_2O_3:yYO_2:zGeO_2:(1-z)SiO_2:fHF:wH_2O$$

wherein M is H+ or one or various inorganic cations with a +n charge; X is one or various trivalent elements, preferably Al, B, Ga, Fe or Cr; Y is one or various tetravalent elements, preferably Ti, Sn or V; R is an organic cation, preferably DABCO-benzyl, Q-benzyl or mixtures thereof, and K is an anion, preferably halide, hydroxide or mixtures thereof.

r=organic cation/(SiO$_2$+GeO$_2$) is between 0.01 and 3, and preferably between 0.03 and 1, In the case of using the DABCO-benzyl cation as a structural agent, the values of r, a, x, y, z, f, and w are in the following ranges:

r=DABCO-benzyl/(SiO$_2$+GeO$_2$)=between 0.01 and 3, and preferably between 0.03 and 1.

a=M$_{1/n}$OH/(SiO$_2$+GeO$_2$)=0–1.0, preferably 0–0.2.

x=X$_2$O$_3$/(SiO$_2$+GeO$_2$)=between 0–0.1, preferably between 0–0.033 and more preferably between 0–0.025.

y=YO$_2$//(SiO$_2$+GeO$_2$)=between 0–0.1, preferably between 0–0.05 and more preferably between 0–0.02.

z=GeO$_2$/(SiO$_2$+GeO$_2$)=between 0 and 0.67, preferably between 0.1 and 0.5 and more preferably between 0.025 and 0.5.

w=H$_2$O/(SiO$_2$+GeO$_2$)=between 0–100, and preferably between 1 and 50, and more preferably between 1–25.

f=HF/(SiO$_2$+GeO$_2$)=between 0.01 and 3, and preferably between 0.03 and 1.

In the case of using Q-benzyl as a structural agent, the values of r, a, x, y, z, f, and w are in the following ranges:

r=Q-benzyl/(SiO$_2$+GeO$_2$)=between 0.01 and 3, and preferably between 0.03 and 1.

a=M$_{1/n}$OH/(SiO$_2$+GeO$_2$)=0–1.0, preferably 0–0.2.

x=X$_2$O$_3$/(SiO$_2$+GeO$_2$)=between 0–0.1, preferably between 0–0.033 and more preferably between 0–0.00625.

y=YO$_2$/(SiO$_2$+GeO$_2$)=between 0–0.1, preferably between 0–0.05 and more preferably between 0–0.02.

z=GeO$_2$/(SiO$_2$+GeO$_2$)=between 0 and 0.5, preferably between 0.04 and 0.33 and more preferably between 0.125 and 0.33.

w=H$_2$O/(SiO$_2$+GeO$_2$)=between 0–100, and preferably between 1–50, and more preferably between 1–25.

f=HF/(SiO$_2$+GeO$_2$)=between 0.01 and 3, and preferably between 0.03 and 1.

In the case of using mixtures of DABCO-benzyl and Q-benzyl as a structural agent, the values of r, a, x, y, z, f, and w are in the following ranges:

r=(DABCO-benzyl+Q-benzyl)/(SiO$_2$+GeO$_2$)=between 0.01 and 3, and preferably between 0.03 and 1.

a=M$_{1/n}$OH/(SiO$_2$+GeO$_2$)=0–1.0, preferably 0–0.2.

x=X$_2$O$_3$/(SiO$_2$+GeO$_2$)=between 0–0.1, preferably between 0–0.033 and more preferably between 0–0.025.

y=YO$_2$/(SiO$_2$+GeO$_2$)=between 0–0.1, preferably between 0–0.05 and more preferably between 0–0.02.

z=GeO$_2$/(SiO$_2$+GeO$_2$)=between 0 and 0.67, preferably between 0.01 and 0.5 and more preferably between 0.025 and 0.05.

w=H$_2$O/(SiO$_2$+GeO$_2$)=between 0–100, and preferably between 1–50, and more preferably between 1–25.

f=HF/(SiO$_2$+GeO$_2$)=between 0.01 and 3, and preferably between 0.03 and 1, the DABCO-benzyl/(DABCO-benzyl+Q-benzyl) ratio being able to vary between 0 and 1, both excluded.

Crystals can be introduced in the synthesis mixture, preferably of zeolite and more preferably of ITQ-17 zeolite as a seed. The seeds can be added as a suspension of the crystals in a suitable liquid, as a pre-organised gel, or as a dry solid.

The thermal treatment of the reaction mixture can be carried out statically or with the mixture being stirred.

The ITQ-17 zeolite obtained by means of this method of synthesis can be separated from the mother liquor by filtration or centrifuging, and can be calcinated in a vacuum, air, N$_2$, or another inert gas in order to eliminate the organic compound. For this, temperatures of at least 250° C. are required, and more preferably above 400° C.

The diffraction pattern of the material without calcinating corresponds to that of the ITQ-17 zeolite that is shown in table 1.

Once the material has been calcinated (when T is Si) it responds to the general formula

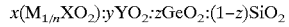

$x(M_{1/n}XO_2):yYO_2:zGeO_2:(1-z)SiO_2$ wherein x has a value of less than 0.2, preferably less than 0.067, and more preferably less than 0.05, and may be equal to zero; y has a value of less than 0.1, preferably less than 0.05, and more preferably less than 0.02, and may be equal to zero; z has a value of between 0 and 0.67, and preferably between 0.01 and 0.67, and more preferably between 0.025 and 0.5; M is H+ or one or various inorganic cations with a +n charge; X is one or various chemical elements with a +3 oxidation status such as, for example, Al, Ga, B, Cr or Fe and Y is one or various chemical elements with a +4 oxidation status such as, for example, Ti, Sn or V.

The material obtained by means of the synthesis method claimed in this description is useful as a catalyst of aromatics alkylation with olefins and alcohols, and more specifically as a catalyst of benzene alkylation with propylene. As a catalyst or additive of catalytic cracking of hydrocarbons. The ITQ-17 zeolite synthesised by means of this invention is claimed as a component of hydro-cracking catalysts, and soft hydro-cracking of hydrocarbons and in general of organic compounds, as a de-paraffining and iso-deparaffining catalyst, as a catalyst for the acylation of substituted aromatic compounds and in Meerwein-Pondorf-Verley reactions, and when the material synthesised according to this synthesis method contains Ti, its use is claimed as a catalyst for the oxidation of olefins to epoxides and alcohols, the oxidation of thio-ethers to sulphoxides and sulphones, ammoximation of cyclohexanone to cyclohexanone oxime with NH$_3$. In the case of the ITQ-17 material, synthesised according to this claim containing Sn, its use is claimed as a catalyst in Meerwein-Pondorf-Verly reactions, and in Bayer-Villiger reactions using H$_2$O$_2$ as an oxidating agent.

BRIEF DESCRIPTION OF THE FIGURES

Some examples of the embodiment of the invention will be described below to contribute to an understanding of same, wherein reference is made to figures that form an integral part of this description, and wherein.

EXAMPLE 1

The synthesis of ITQ-17 containing Si and Ge in a Si/Ge=5 ratio, using the DABCO-benzyl cation as a structure directing agent is described in this example.

5.79 g of tetraethylorthosilicate (TEOS) are hydrolysed in 16.7 g of an aqueous solution of DABCO-benzyl (9.98.10$^{-4}$ moles of DABCO-benzyl (OH)/g). 0.581 g of GeO$_2$ are then added. The mixture is then left being stirred and the ethanol formed in the TEOS hydrolysis evaporated, and 7.26 g of water, Lastly, 0.67 of HF (50% aq.) is added. The resulting mixture is heated to 150° C. in autoclaves lined internally with PTFE. After 14 hours of heating, the mixture is filtered and 18 g of ITQ-17 zeolite are obtained for each 100 g of synthesis gel. The material is then calcinated at 580° C.

Figure 1:
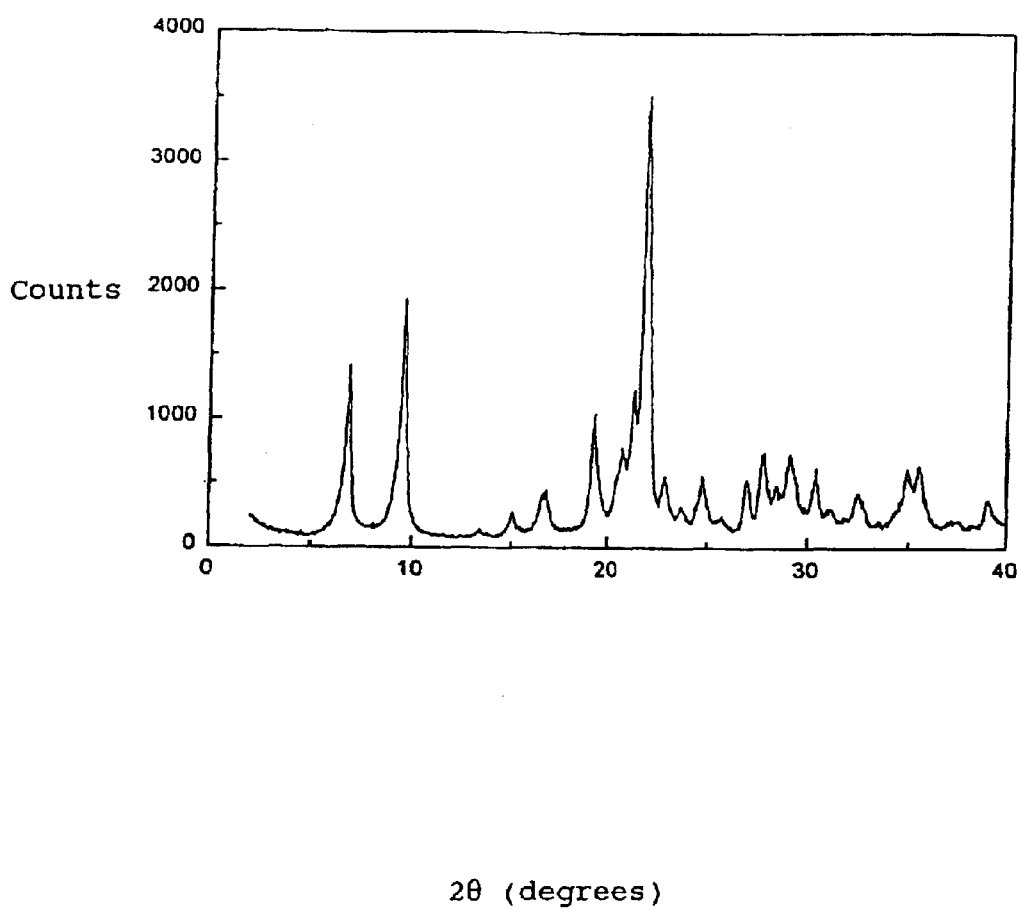
FIG. 1 is an X-ray diffraction pattern of the material as synthesised in example 1.
Figure 2:
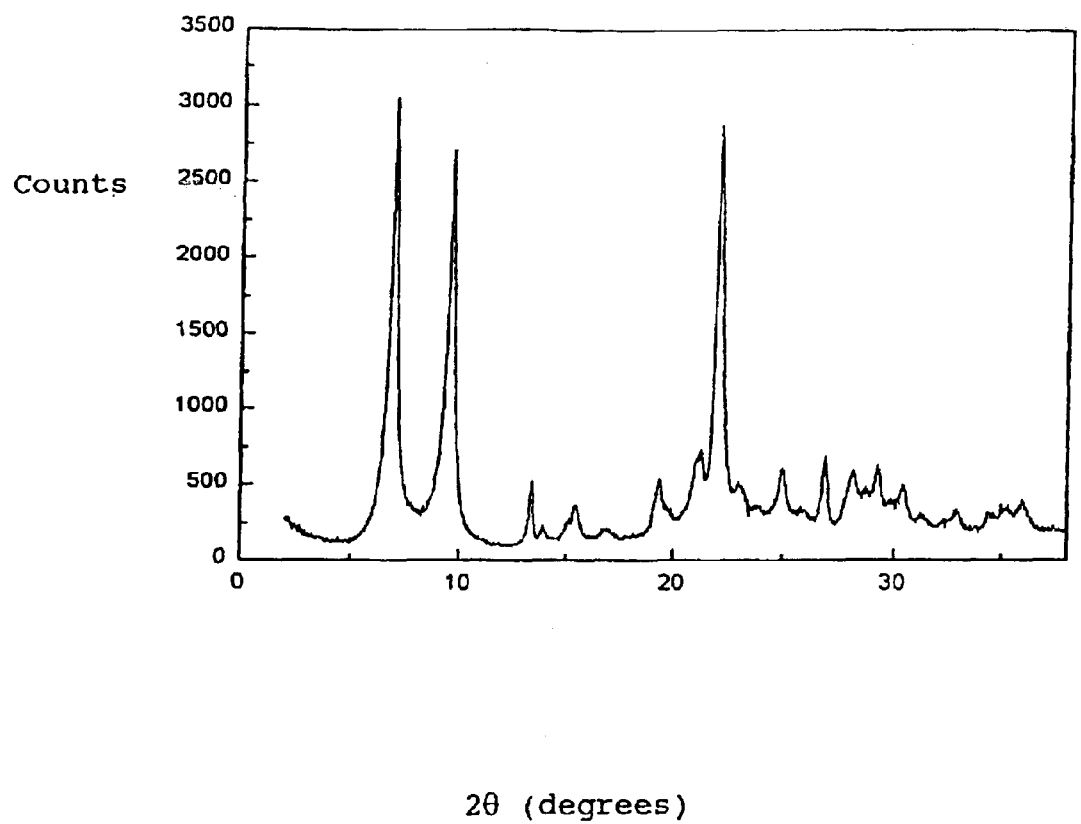
FIG. 2 is an X-ray diffraction pattern of the material of example 1 after calcination.

FIG. 1 shows the diffraction pattern for the material obtained as synthesised while FIG. 2 shows the X-ray diffraction pattern of the same material in its calcinated and anhydrous state.

EXAMPLE 2

The synthesis of ITQ-17 containing Si and Ge in a Si/Ge=2 ratio, using the DABCO-benzyl cation as a structure directing agent is described in this example.

4.17 g of tetraethylorthosilicate (TEOS) are hydrolysed in 7.5 g of an aqueous solution of DABCO-benzyl (2.10$^{-3}$ moles of DABCO-benzyl (OH)/g). 1.045 g of GeO$_2$ and 0.3 g of water are then added. The mixture is then left being stirred and the ethanol formed in the TEOS hydrolysis evaporated. Lastly, 0.60 of HF (50% aq.) are added. The resulting mixture is heated to 150° C. in autoclaves lined internally with PTFE. After 12 hours of heating, the mixture is filtered and 13 g of ITQ-17 zeolite are obtained for each 100 g of synthesis gel.

Figure 3:
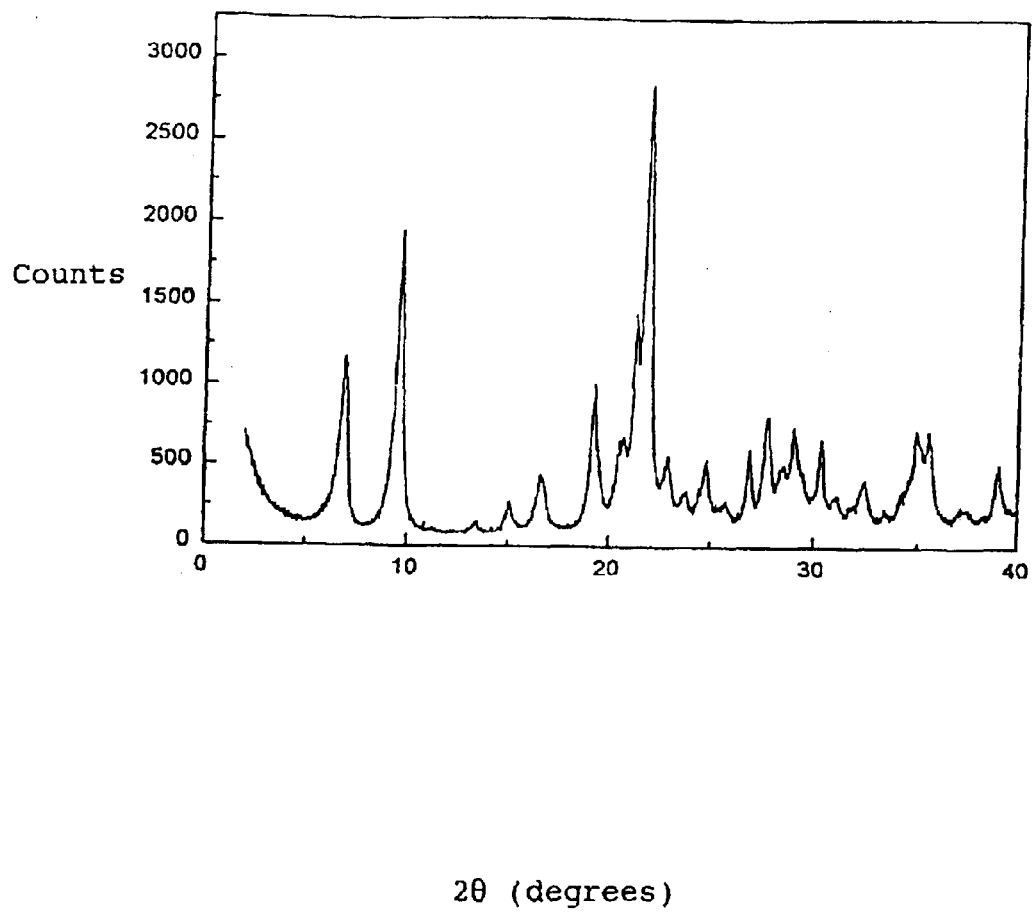
FIG. 3 is an X-ray diffraction pattern of the material as synthesised in example 2.

The X-ray diffraction pattern is shown in FIG. 3.

EXAMPLE 3

The synthesis of ITQ-17 containing the Si and Ge in a Si/Ge=5 ratio, using the Q-benzyl cation as a structure directing agent is described in this example.

5.8 g of tetraethylorthosilicate (TEOS) are hydrolysed in 21.4 g of an aqueous solution of Q-benzyl (7.8.10$^{-4}$ moles of Q-benzyl (OH)/g). 0.58 g of GeO$_2$ and 0.3 g of water are then added. The mixture is then left being stirred and the ethanol formed in the TEOS hydrolysis evaporated, and 12.55 g of water. Lastly, 0.667 g of HF (50% aq.) is added. The resulting mixture is heated to 150° C. in autoclaves lined internally with PTFE. After 14 hours of heating, the mixture is filtered and 24 g of ITQ-17 zeolite are obtained for each 100 g of synthesis gel.

Figure 4:
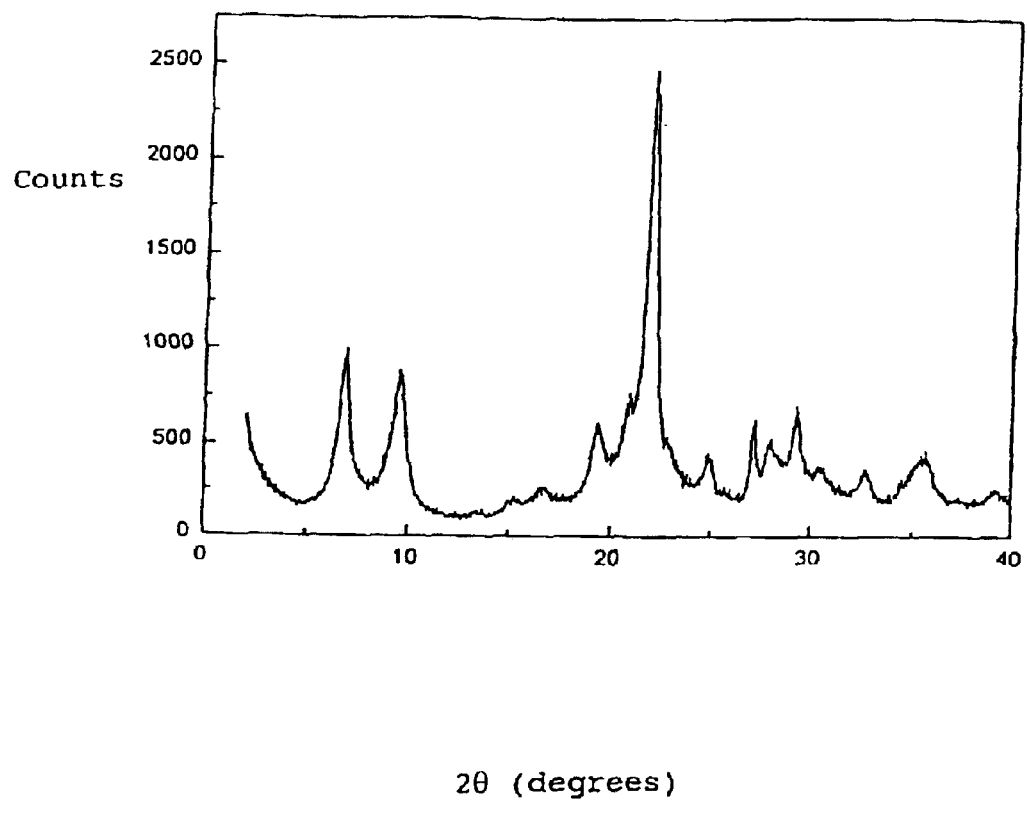
FIG. 4 is an X-ray diffraction pattern of the material as synthesised in example 3.

The X-ray diffraction pattern is shown in FIG. 4.

EXAMPLE 4

The synthesis of ITQ-17 containing Si, Al and Ge in a Si/Ge=15 ratio, using the Dabco-benzyl cation as a structure directing agent, is described in this example.

7.32 g of tetraethylorthosilicate (TEOS) are hydrolysed in 21.8 g of an aqueous solution of Dabco-benzyl (9.27.10$^{-4}$ moles of Dabco-benzyl (OH)/g). 0.245 g of GeO$_2$ and 0.306 g of aluminium isopropoxide are then added. The mixture is then left being stirred and the ethanol formed in the TEOS hydrolysis, evaporated, and 5.6 g of water. Lastly, 0.75 g of HF (50% aq.) are added. The resulting mixture is heated to 150° C. in autoclaves lined internally with PTFE. After 7 days of heating, the mixture is filtered and 9 g of ITQ-17 zeolite are obtained for each 100 g of synthesis gel.

Figure 5:
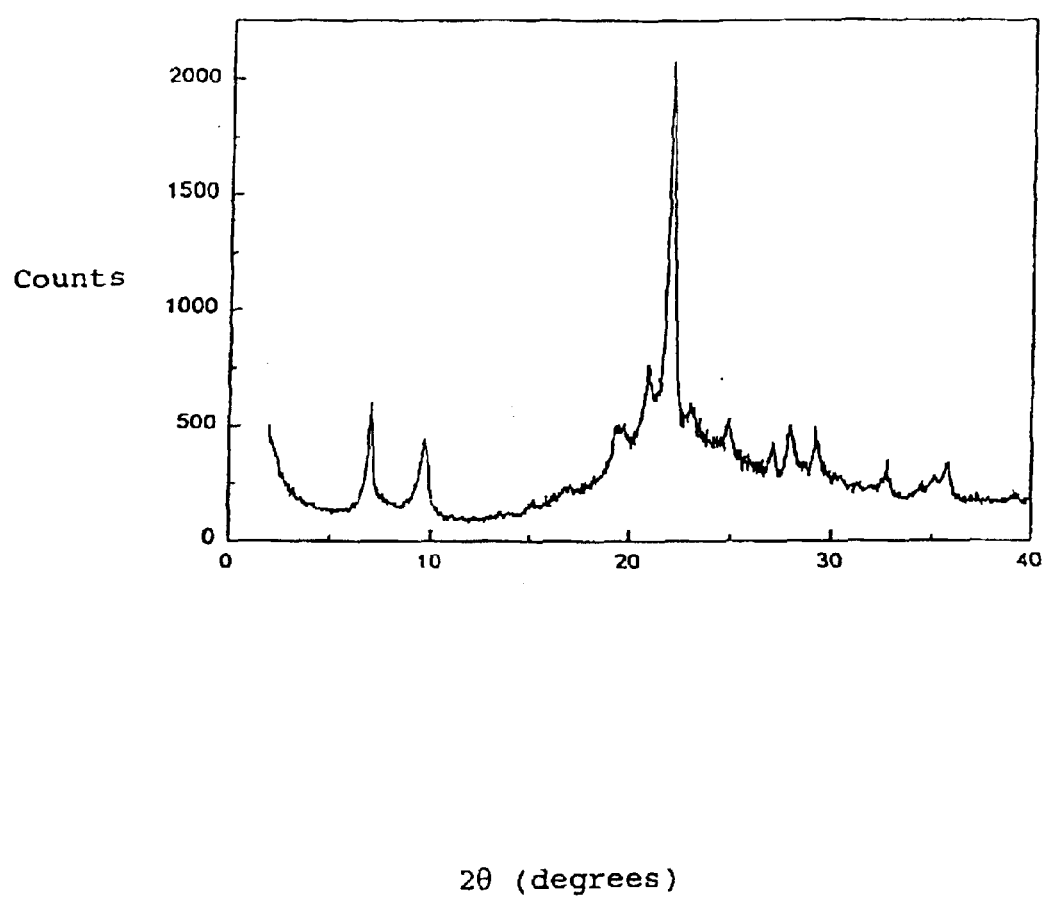
FIG. 5 is an X-ray diffraction pattern of the material as synthesised in example 4.

The X-ray diffraction pattern is shown in FIG. 5.

EXAMPLE 5

The synthesis of ITQ-17 containing the Si and Ge in a Si/Ge=15 ratio, using the DABCO-benzyl cation as a structure directing agent, is described in this example.

6.51 g of tetraethylorthosilicate (TEOS) are hydrolysed in 16.7 g of an aqueous solution of Dabco-benzyl (9.98.10$^{-4}$ moles of DABCO-benzyl (OH)/g). 0.218 g of GeO$_2$ are then added. The mixture is then left being stirred and the ethanol formed in the TEOS hydrolysis, evaporated, and 7.13 of water. Lastly, 0.67 g of HF (50% aq.) are added. The resulting mixture is heated to 150° C. in autoclaves lined internally with PTFE. After 39 hours of heating, the mixture is filtered and 15 g of ITQ-17 zeolite are obtained for each 100 g of synthesis gel.

Figure 6:
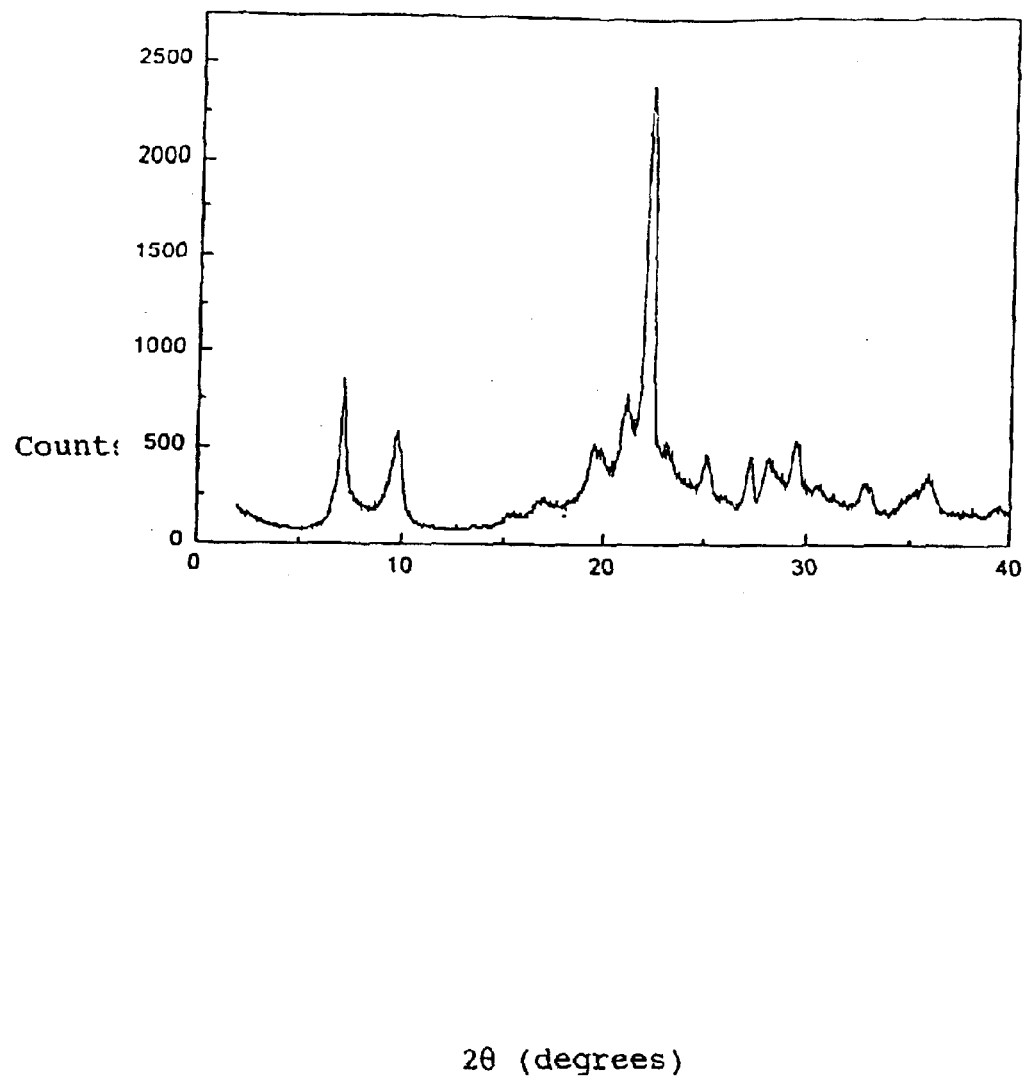
FIG. 6 is an X-ray diffraction pattern of the material as synthesised in example 5.

The X-ray diffraction pattern is shown in FIG. 6.

What is claimed is:

1. A microporous crystalline material of a zeolitic nature with a chemical composition in the calcinated and anhydrous state that can be represented by the empirical formula:

$x(M_{1/n}XO_2){:}yYO_2{:}zGeO_2{:}(1-z)TO_2$ wherein x has a value between 0 and 0.2;

y has a value between 0 and 0.1;

z has a value between 0 and 0.67;

being at least one of z, x and y above zero:

M is selected between H+ and inorganic cations with +n charge;

X is at least a chemical element in a+3 oxidation state;

Y is at least a chemical element in a+4 oxidation state;

T is at least a chemical element in a+4 oxidation state, wherein the material, as synthesised, has an X-ray diffraction pattern of

| 2θ (±0.5 degrees) | Relative Intensity (I/I$_0$) |
|---|---|
| 6.91 | s–vs |
| 9.60 | s–vs |
| 19.29 | w |
| 21.34 | w |
| 21.88 | s–vs |
| 27.00 | vw |
| 27.80 | vw |
| 29.09 | vw |
| 30.40 | vw |
| 32.56 | vw |
| 35.04 | vw |
| 35.63 | vw |
| 39.01 | vw | and wherein the material in a calcinated and anhydrous state has an X-ray diffraction pattern of:

| 2θ (±0.5 degrees) | Relative Intensity (I/I$_0$) |
|---|---|
| 6.94 | s–vs |
| 9.60 | s–vs |
| 13.38 | vw |
| 15.01 | vw |
| 22.09 | w |
| 24.96 | vw |
| 26.90 | vw | wherein vw means a very weak relative intensity, between 0 and 20%;

w means a weak relative intensity, between 20 and 40%;

m means an average relative intensity, between 40 and 60%;

s means a strong relative intensity, between 60 and 80%;

vs means a very strong relative intensity, between 80 and 100%.

2. A material according to claim 1, wherein the material, as synthesised, has an X-ray diffraction pattern that also shows the values of angle 2θ the relative intensities (I/I$_0$)

| 2θ (±0.5 degrees) | Relative Intensity (I/I$_0$) |
|---|---|
| 15.09 | vw |
| 16.51 | vw |
| 20.48 | vw |
| 22.94 | vw |
| 24.80 | vw |
| 28.53 | vw |
| 31.14 | vw |
| 39.01 | vw | and wherein the material, in a calcinated and anhydrous state has an X-ray diffraction pattern that also has the values of angle 2θ and the relative intensities (I/I$_0$)

| 2θ (±0.5 degrees) | Relative Intensity (I/I₀) |
|---|---|
| 13.94 | vw |
| 19.35 | vw |
| 21.03 | vw |
| 21.29 | vw |
| 28.11 | vw |
| 29.21 | vw |
| 30.34 | vw |
| 32.93 | vw. |

3. A material according to claim 1 or 2, wherein T is Si.

4. A material according to claim 1 or 2, wherein T is Si; and y is zero.

5. A material according to claim 1 or 2, wherein x is zero and T is Si.

6. A material according to claim 1 or 2, wherein M is H, T is Si and y is zero.

7. A material according to claim 1 or 2, wherein x and y are zero; and T is Si.

8. A material according to claim 1 or 2, wherein z and y are zero.

9. A material according to claim 1 or 2, wherein z and y are zero; and T is Si.

10. A material according to claim 1, wherein T is selected from among Si, Ge, Ti, Sn and V.

11. A material according to any one of claims 1 and 2, wherein X is selected from among Al, Ga, B, Cr and Fe.

12. A material according to any one of claims 1 and 2, wherein Y is selected from among Ti, Sn and V.

13. A material according to any one of claims 1 and 2, wherein x has a value lower than 0.067 but greater than zero.

14. A material according to any one of claims 1 and 2, wherein y has a value lower than 0.05 but greater than zero.

15. A material according to any one of claims 1 and 2, wherein z has a value between 0.1 and 0.67.

16. A material according to any one of claims 1 and 2, wherein x has a value lower than 0.05.

17. A material according to any one of claims 1 and 2, wherein y has a value lower than 0.02.

18. A material according to any one of claims 1 and 2, wherein z has a value between 0.025 and 0.5.

19. A method for synthesising a zeolite in accordance with one of claims 1 and 2, which comprises subjecting a reaction mixture containing:
a source of $SiO_2$,
optionally a source of $GeO_2$,
optionally a source of at least one other tetravalent Y element,
optionally a source of at least one other trivalent X element,
an organic cation selected from among a DABCO-benzyl cation, Q-benzyl cation, and a DABCO-benzyl cation and Q-benzyl cation mixture in a DABCO-benzyl/(DABCO-benzyl+Q-benzyl) ratio of between 0 and 1,
a source of fluoride anions,
and water to heating at a temperature of between 80 and 200° C., until crystallisation of the reaction mixture has been achieved wherein the composition of the reaction mixture has the general empirical formula $rRKM:aM_{1/n}OH:xX_2O_3:yYO_2:zGeO_2:(1-z)SiO_2:fHF:wH_2O$ wherein the values of r, a, x, y, z, f and w are r=organic cation/($SiO_2$+$GeO_2$) is between 0.01 and 3,
a=$M_{1/n}OH$/($SiO_2$±$GeO_2$)=0–1.0,
x=$X_2O_3$/($SiO_2$+$GeO_2$)=0–0.1,
y=$YO_2$/($SiO_2$+$GeO_2$)=0–0.1,
z=$GeO_2$/($SiO_2$+$GeO_2$)=between 0 and 0.67,
w=$H_2O$/($SiO_2$+$GeO_2$)=is 0–100,
f=HF/($SiO_2$+$GeO_2$) is between 0.01 and 3, wherein
at least one of x, z and y is above 0, and wherein M is selected between H+ and at least one inorganic cation with +n charge;
X is at least one trivalent element;
Y is at least one tetravalent element;
R is the organic cation; and
K is an anion.

20. A method according to claim 19, wherein the organic cation is added to the reaction mixture in the form of an hydroxide or in the form of a mixture of hydroxide and another salt.

21. A method according to claim 19, wherein a quantity of the crystalline material is added to the reaction mixture as a crystallisation promoter, said quantity being in the range of 0.01 to 15% in weight with respect to the total silica added.

22. A method according to claim 19, wherein a quantity of the crystalline material is added to the reaction mixture as a crystallisation promoter said crystalline material being that defined in claim 1.

23. A method for use of a crystalline material defined in any one of claims 1 and 2, as a catalyst in a process selected among cracking, hydrocracking, soft hydro-cracking of hydrocarbons and/or functionalised hydrocarbons, hydro-isomerisation of olefins, alkylation of olefins with iso-paraffins, alkylation of aromatics with olefins or alcohols, and alkylation of benzene with propylene, wherein the method comprises putting selected reactives in contact with the crystalline material.

24. A method for use of a crystalline material defined in any one of claims 1 and 2, as an oxidant in a selective oxidation process of organic compounds using $H_2O_2$, organic peroxides or hydro-peroxides, wherein the method comprises putting selected reactives in contact with the crystalline material.

25. A method for use of a crystalline material that contains Sn, defined in any one of claims 1 and 2, as oxidant agent in an oxidating process of the Baeyer-Villiger type, wherein the method comprises putting selected reactives in contact with the crystalline material.

26. A method for use of a crystalline material that contains Sn, defined in any one of claims 1 and 2, as a catalyst in a process of the Meerwein-Pondorf-Verley type, wherein the method comprises putting selected reactives in contact with the crystalline material.

27. A method for use of a crystalline material that contains Ti, defined in any one of claims 1 and 2, as an oxidation catalyst in a process selected from among processes from olefins to epoxides and alcohols, oxidation of thio-ethers to sulphoxides and sulphones, ammoximation of cyclohexanone to cyclohexanone oxime with $NH_3$, wherein the method comprises putting selected reactives in contact with the crystalline material.

* * * * *